(12) United States Patent
Lee et al.

(10) Patent No.: US 11,129,202 B2
(45) Date of Patent: Sep. 21, 2021

(54) METHOD FOR TRANSMITTING OR RECEIVING SIGNAL IN WIRELESS COMMUNICATION SYSTEM AND DEVICE THEREFOR

(71) Applicant: LG Electronics Inc., Seoul (KR)

(72) Inventors: Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/487,268

(22) PCT Filed: Jan. 24, 2018

(86) PCT No.: PCT/KR2018/001054
§ 371 (c)(1),
(2) Date: Aug. 20, 2019

(87) PCT Pub. No.: WO2018/151434
PCT Pub. Date: Aug. 23, 2018

(65) Prior Publication Data
US 2020/0022188 A1 Jan. 16, 2020

Related U.S. Application Data

(60) Provisional application No. 62/460,888, filed on Feb. 20, 2017.

(51) Int. Cl.
*H04W 74/08* (2009.01)
*H04L 1/08* (2006.01)
*H04W 72/12* (2009.01)

(52) U.S. Cl.
CPC ........... *H04W 74/0833* (2013.01); *H04L 1/08* (2013.01); *H04W 72/121* (2013.01); *H04W 72/1268* (2013.01)

(58) Field of Classification Search
None
See application file for complete search history.

(56) References Cited

U.S. PATENT DOCUMENTS

2012/0176967 A1* 7/2012 Kim .................... H04W 52/346
370/328
2013/0343768 A1* 12/2013 Jang .................... H04B 10/116
398/183

(Continued)

FOREIGN PATENT DOCUMENTS

CN 105210442 12/2015
CN 106165325 11/2016

(Continued)

OTHER PUBLICATIONS

Intel Corporation, "Further considerations of random access in NR," R2-1700335, 3GPP TSG-RAN WG2 NR Ad-hoc, Spokane, Washington, USA, Jan. 17-19, 2017, 4 pages.

(Continued)

*Primary Examiner* — Mansour Oveissi
*Assistant Examiner* — David M Oveissi
(74) *Attorney, Agent, or Firm* — Fish & Richardson P.C.

(57) ABSTRACT

A method by which a terminal transmits an uplink signal in a wireless communication system, according to one embodiment of the present invention, includes: transmitting any one of a plurality of preambles; and performing a contention-based transmission of data in consideration of the transmitted preamble, wherein each of the plurality of preambles is linked with a plurality of data resource areas, and when the contention-based transmission of data is performed, the terminal can repeatedly transmit the data through the plurality of data resource areas linked with the transmitted preamble. The UE is capable of communicating with at least (Continued)

one of another UE, a UE related to an autonomous driving vehicle, a base station or a network.

8 Claims, 11 Drawing Sheets

(56) References Cited

U.S. PATENT DOCUMENTS

2017/0164411 A1* 6/2017 Choi ................. H04W 74/0833
2019/0320468 A1* 10/2019 Svedman .......... H04W 74/0833

FOREIGN PATENT DOCUMENTS

| CN | 106233794 | 12/2016 |
|----|-----------|---------|
| EP | 3582571 | 12/2019 |
| JP | 2014220662 | 11/2014 |
| KR | 20150044366 | 4/2015 |
| WO | WO2016111219 | 7/2016 |
| WO | WO2016163126 | 10/2016 |
| WO | WO2016163508 | 10/2016 |

OTHER PUBLICATIONS

Nokia, Alcatel-Lucent Shanghai Bell, "Non-orthogonal coded access," R1-1612793, 3GPP TSG-RAN WG1 #87, Reno, USA, dated Nov. 14-18, 2016, 8 pages.
Intel Corporation, "Considerations of random access in NR," R2-168521, 3GPP TSG-RAN WG2 #96, Reno, Nevada, USA, Nov. 14-18, 2016, 5 pages.
Nokia, Alcatel-Lucent Shanghai Bell, "Channel structure for contention based access," R1-167254, 3GPP TSG-RAN WG1 #86, Gothenburg, Sweden, Aug. 22-26, 2016, 4 pages.
InterDigital Communications, "On the Performance of Interleaved-based Multiple Access Schemes," R1-1609892, 3GPP TSG RAN WG1 Meeting #86bis, Lisbon, Portugal, Oct. 10-14, 2016, 6 pages.
PCT International Search Report and Written Opinion in International Application No. PCT/KR2018/001054, dated May 9, 2018, 21 pages (with English translation).
Catt, "Consideration on random access for R13 eMTC," R2-154082, 3GPP TSG RAN WG2 Meeting #91bis, Malmo, Sweden, dated Oct. 5-9, 2015, 7 pages.
Catt, "Further considerations on a 2-step RA Procedure," R1-1700186, 3GPP TSG RAN WG1 AH_NR Meeting, Spokane, USA, dated Jan. 16-20, 2017, 4 pages.
Extended European Search Report in European Application No. 18753732.9, dated Oct. 23, 2020, 11 pages.
Intel Corporation, "Grant-free UL transmissions in NR," R1-1609499, 3GPP TSG-RAN WG1 #86bis, Lisbon, Portugal, dated Oct. 10-14, 2016, 8 pages.
Intel Corporation, "Support of link adaptation for UL grant-free NOMA schemes," R1-1610374, 3GPP TSG-RAN WG1 #86bis, Lisbon, Portugal, dated Oct. 10-14, 2016, 4 pages.
Japanese Office Action in Japanese Application No. 2019-545358, dated Dec. 1, 2020, 14 pages (with English translation).
Nokia, Alcatel-Lucent Shanghai Bell, "Preamble transmission Procedures for the mMTC uplink," R1-1609653, 3GPP TSG-RAN WG1 #86bis, Lisbon, Portugal, dated Oct. 10-14, 2016, 6 pages.
CN Office Action in Chinese Appln. No. 201880012874.5, dated Jul. 6, 2021, 16 pages (with English translation).
ZTE & ZTE Microelectronics, "Further Consideration on the Preamble Design for Grant-free Non-orthogonal MA," R1-1611500, Presented at 3GPP TSG RAN WG1 Meeting #87, Reno, USA, Nov. 14-18, 2016, 7 pages.

* cited by examiner (a)

(b)

(a) Case in which front-located DMRS is present (b) Case in which front-located DMRS is replaced with data

METHOD FOR TRANSMITTING OR RECEIVING SIGNAL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/001054, filed on Jan. 24, 2018, which claims the benefit of U.S. Provisional Application No. 62/460,888, filed on Feb. 20, 2017. The disclosures of the prior applications are incorporated by reference in their entirety.

TECHNICAL FIELD

The present disclosure relates to a wireless communication system, and more particularly, to a method of transmitting or receiving a signal in a contention-based manner and device therefor.

BACKGROUND ART

As a number of communication devices have required much higher communication capacity, scenarios for the next generation communication system (e.g., 5G or new RAT) have been discussed in recent years. For example, Enhanced Mobile Broadband (eMBB), Ultra-reliable Machine-Type Communications (uMTC), and Massive Machine-Type Communications (mMTC) are included in the scenarios. The eMBB corresponds to a next generation mobile communication scenario characterized by high spectrum efficiency, high user experienced data rates, high peak data rates, etc. The uMTC corresponds to a next generation mobile communication scenario characterized by ultra-high reliability, ultra-low latency, ultra-high availability, etc. For example, the uMTC may include V2X, emergency services, remote control, etc. The mMTC corresponds to a next generation mobile communication scenario characterized by low cost, low energy, short packets, massive connectivity, etc. For example, the mMTC may include Internet of Things (IoT).

FIG. 1 illustrates relation between core performance requirements for 5G, which are proposed in IMT 2020, and 5G performance requirements for each service scenario. In particular, uMTC services have extremely restricted Over-The-Air (OTA) latency requirements and requires high mobility and reliability (e.g., OTA Latency<1 ms, Mobility>500 km/h, and BLER<10-6).

For the next generation wireless communication, new Radio Access Technology (RAT) considering the eMBB, mMTC, URLCC, etc. has been discussed.

DISCLOSURE

Technical Problem

The object of the present disclosure is to provide a method capable of performing contention-based signal transmission and reception accurately and efficiently and device therefor.

It is to be understood that both the foregoing general description and the following detailed description of the present disclosure are exemplary and explanatory and are intended to provide further explanation of the disclosure as claimed.

Technical Solution

In an aspect of the present disclosure, provided herein is a method of transmitting an uplink signal by a user equipment (UE) in a wireless communication system. The method may include transmitting any one of multiple preambles and performing contention-based data transmission by considering the transmitted preamble. Each of the multiple preambles may be associated with multiple data resource regions. When performing the contention-based data transmission, the UE may repeatedly transmit data in multiple data resource regions associated with the transmitted preamble.

In another aspect of the present disclosure, provided herein is a user equipment (UE) for transmitting an uplink signal. The UE may include a transmitter and a processor configured to transmit any one of multiple preambles using the transmitter and perform contention-based data transmission by considering the transmitted preamble. Each of the multiple preambles may be associated with multiple data resource regions. In performing the contention-based data transmission, the processor may be configured to repeatedly transmit data in multiple data resource regions associated with the transmitted preamble.

In still another aspect of the present disclosure, provided herein is a method of receiving an uplink signal by a base station in a wireless communication system. The method may include receiving any one of multiple preambles and receiving data transmitted in a contention-based manner by considering the received preamble. Each of the multiple preambles may be associated with multiple data resource regions. When receiving the data, the base station may repeatedly receive the data in multiple data resource regions associated with the received preamble.

In a further aspect of the present disclosure, provided herein is a base station for receiving an uplink signal. The base station may include a receiver and a processor configured to receive any one of multiple preambles using the receiver and receive data transmitted in a contention-based manner by considering the received preamble. Each of the multiple preambles may be associated with multiple data resource regions. In receiving the data, the processor may be configured to repeatedly receive the data in multiple data resource regions associated with the received preamble.

The UE may repeatedly transmit the data as many times as the number of the multiple data resource regions associated with the transmitted preamble. For example, each of the multiple preambles may be associated with a different number of data repetitions.

Each of the multiple preambles may be allocated on a UE group basis. That is, UEs belonging to the same UE group may use the same preamble.

The UE may receive information on allocation of the multiple preambles from a base station and select the preamble transmitted by the UE from among the multiple preambles according to its channel state.

A spreading sequence code for contention-based transmission may be applied to the data, and each of the multiple preambles may be associated with a different spreading sequence code.

Advantageous Effects

According to the present disclosure, additional information on a data transmission and reception method can be provided in a preamble in advance, thereby performing contention-based signal transmission and reception more accurately and efficiently.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure, and are incorporated in and constitute a part of this specification, illustrate embodiments of the disclosure and together with the description serve to explain the principles of the disclosure.

BEST MODE

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/ GPRS/EDGE (Global System for Mobile communications)/ General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present disclosure may be non-limited. Specific terminologies used in the following description are provided to help understand the present disclosure and the use of the terminologies can be modified to a different form within a scope of the technical idea of the present disclosure.

Prior to discussion of the New RAT, the 3GPP LTE/ LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
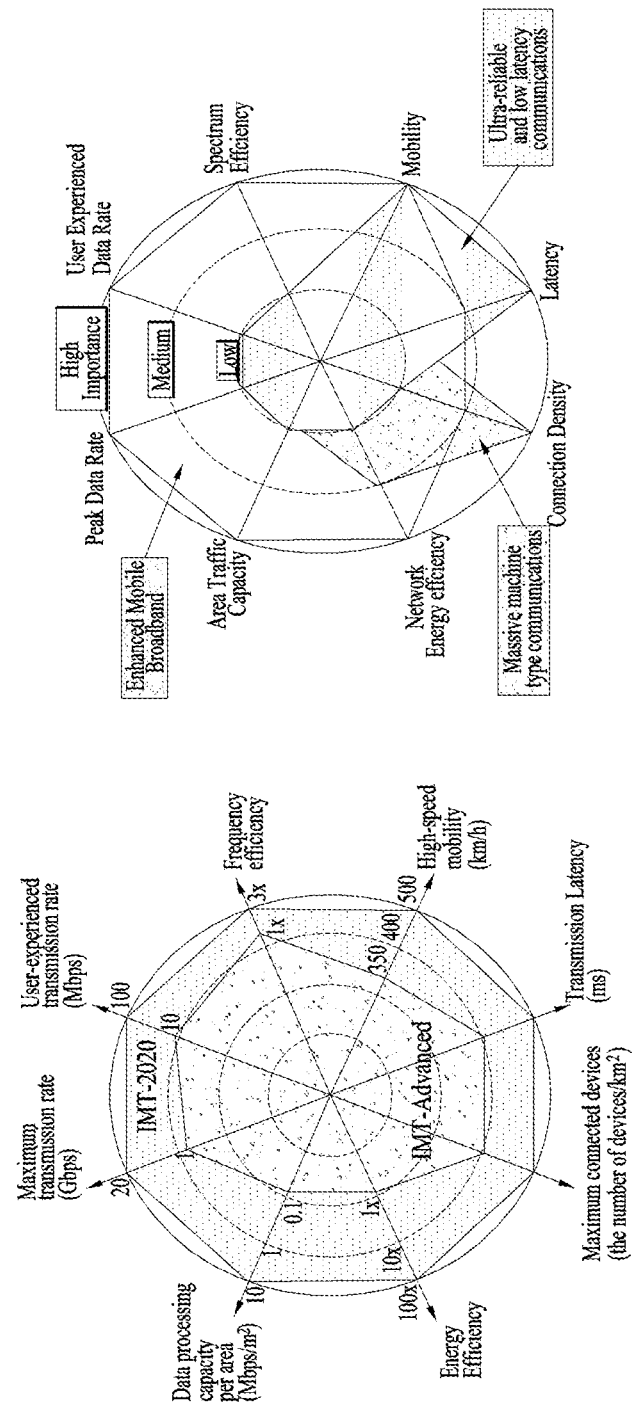
FIG. 1 illustrates a 5G service scenario and performance requirements thereof.
Figure 2:
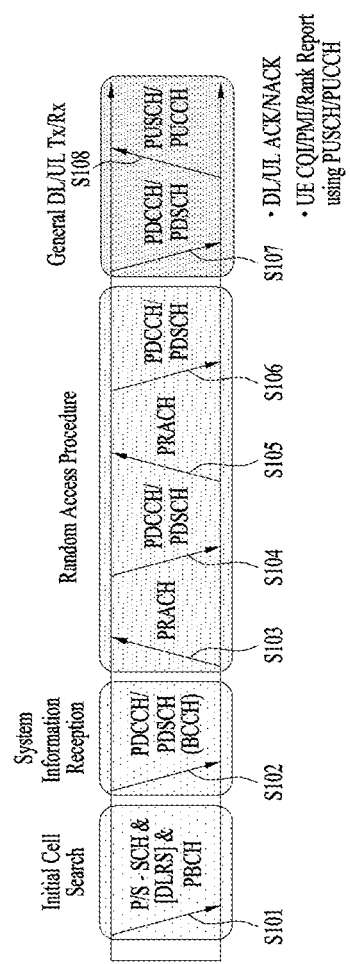
FIG. 2 illustrates physical channels used in the 3GPP LTE/LTE-A system and a general signal transmission method using the same.

FIG. 2 is a diagram for explaining an example of physical channels used for 3GPP LTE/LTE-A system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Hereinafter, a contention-based random access procedure in the LTE system will be described in detail.

(1) Message 1 transmission: A User Equipment (UE) may randomly select one random access preamble from a random access preamble set indicated by system information or a handover command. Thereafter, the UE may select Physical Random Access Channel (PRACH) resources and then transmit the random access preamble using the selected PRACH resources.

(2) Message 2 reception: After transmitting the random access preamble, the UE attempts to receive a random access response within a random access response reception window indicated through the system information or the handover command by an eNB. More specifically, the random access response may be transmitted in the form of a Medium Access Control Protocol Data Unit (MAC PDU), and the MAC PDU may be delivered over a Physical Downlink Shared Channel (PDSCH). To receive information on the PDSCH successfully, the UE needs to monitor a Physical Downlink Control Channel (PDCCH). That is, a PDCCH preferably includes information on a UE to receive the PDSCH, information on time and frequency radio resources of the PDSCH, and information on a transmission format of the PDSCH. Once the UE succeeds in receiving the PDCCH destined therefor, the UE may successfully receive the random access response over the PDSCH according to information included in the PDCCH. The random access response may include an identifier (ID) of the random access preamble (e.g., a Random Access Preamble ID (RAPID)), an Uplink (UL) grant indicating UL radio resources, a temporary Cell-Radio Network Temporary Identifier (C-RNTI), and a Timing Advance Command (TAC).

(3) Message 3 transmission: Upon receiving a valid random access response, the UE processes information included in the random access response. That is, the UE applies the TAC and stores the temporary C-RNTI. In addition, the UE may store data to be transmitted in response to the received valid random access response in a message 3 buffer. Meanwhile, the UE transmits data (i.e. message 3) to the eNB using the received UL grant. Message 3 should include an ID of the UE. This is because in the contention-based random access procedure, the eNB cannot identify which UE performs the random access procedure but the eNB should identify the UEs to avoid a collision later.

(4) Message 4 reception: After transmitting the data including its ID based on the UL grant included in the random access response, the UE awaits reception of a command for contention resolution from the eNB. That is, the UE attempts to receive a PDCCH to receive a specific message. If the UE receives the PDCCH using its C-RNTI, the UE terminates the random access procedure after determining that the random access procedure has been performed normally.

Figure 3:
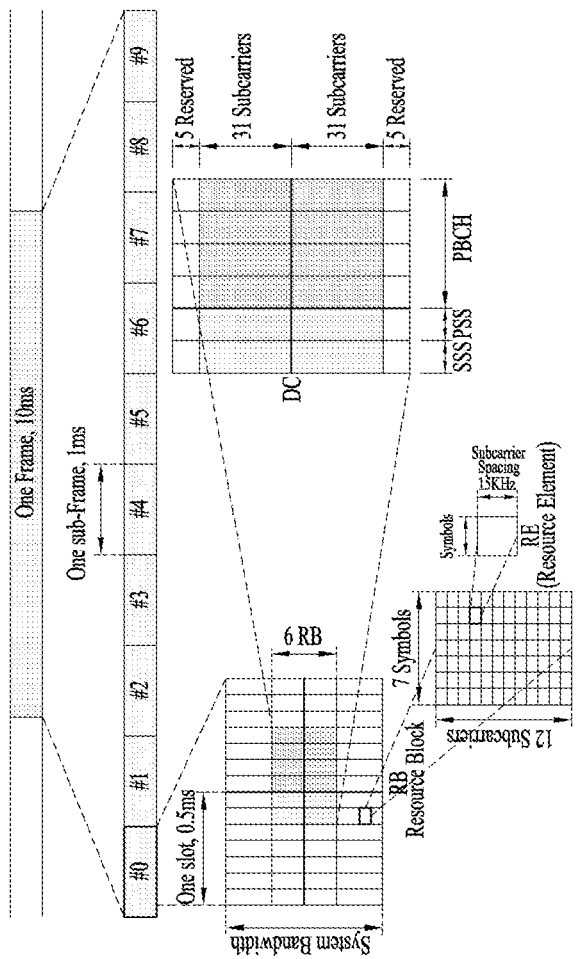
FIG. 3 illustrates the structure of a radio frame of the 3GPP LTE/LTE-A system.

FIG. 3 is a diagram for explaining an example of a structure of a radio frame. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, when normal CP is used, 1 RB is defined as 12 subcarriers with 15 kHz subcarrier spacing and 7 OFDM symbols.

6 RBs at the center frequency are used to transmit a Primary Synchronization Signal (PSS) and a Secondary Synchronization Signal (SSS), which are used to establish synchronization, and a Physical Broadcast Channel (PBCH) for system information transmission. The above-described frame structure, signals, and channel locations may vary depending on a normal/extended CP, TDD/FDD, etc.

Figure 4:
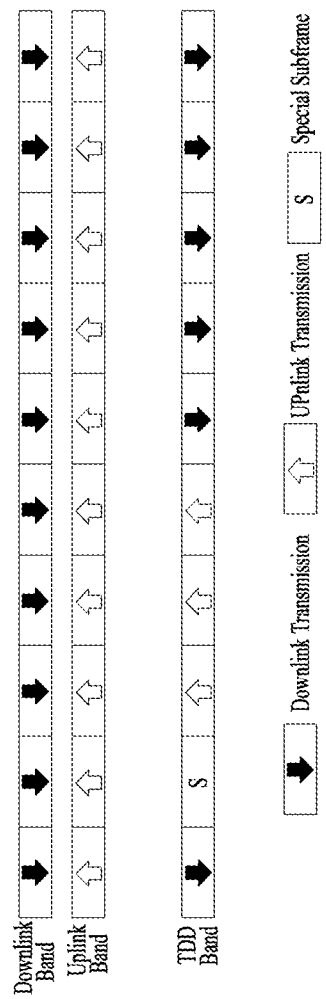
FIG. 4 illustrates Frequency Division Duplex (FDD) and Time Division Duplex (TDD) schemes of the 3GPP LTE/LTE-A system.

FIG. 4 illustrates FDD and TDD in the LTE/LTE-A system. Referring to FIG. 4, in the FDD, different frequency bands are used for DL and UL transmission, respectively. On the other hand, in the TDD, DL and UL regions are separated from each other on a subframe basis in the same frequency band.

Hereinafter, UL multiple access schemes of the LTE system will be described.

First, an SC-FDMA transmission scheme is explained. SC-FDMA may be referred to as Discrete Fourier Transform-spreading-Orthogonal Frequency Divisional Multiple Access (DFT-s-OFDMA). The SC-FDMA is an efficient transmission scheme capable of maintaining Peak-to-Average Power Ratio (PAPR) or a Cube Metric (CM) value at a low level and avoiding a non-linear distortion part of a power amplifier. The PAPR is a parameter representing waveform properties and obtained by dividing the peak value of waveform amplitude by a time-averaged root mean square (RMS) value. The CM is another measurement value representing the PAPR value. The PAPR is associated with a dynamic range which should be supported by a power amplifier at a transmitter. That is, to support transmission with a high PAPR value, the dynamic range (or a linear part) of the power amplifier needs to increase. Since the cost of the power amplifier increases as the dynamic range of the power amplifier increases, a transmission scheme capable of maintaining a low PAPR value is suitable for UL transmission. Accordingly, the current 3GPP LTE system has used the SC-FDMA capable of maintaining low PAPR as a UL transmission scheme.

Figure 5:
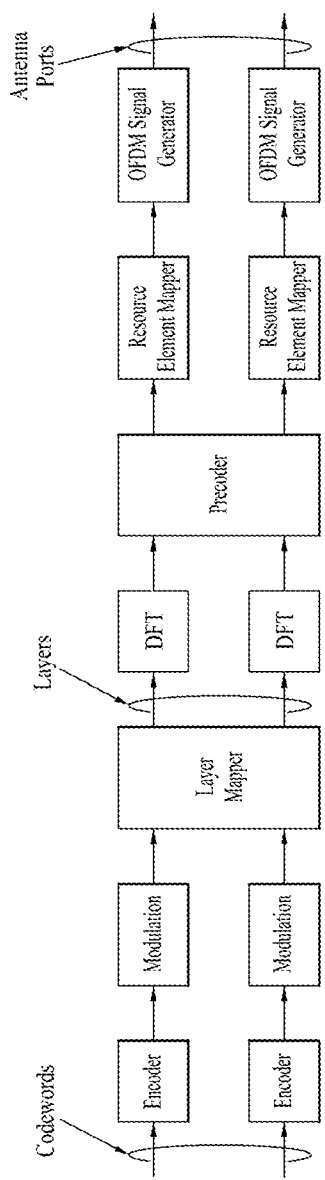
FIG. 5 illustrates an uplink data transmission procedure of the 3GPP LTE/LTE-A system.

FIG. 5 is a block diagram for explaining a DFT-s-OFDMA (or SC-FDMA) scheme for LTE uplink.

One or more codewords encoded by an encoder can be scrambled using a UE-specific scrambling signal. The scrambled codewords are modulated to complex symbols using a BPSK, QPSK, 16 QAM or 64 QAM scheme depending on the type of a transmitted signal and/or a channel state. Thereafter, the modulated complex symbols are mapped to one or more layers.

Although one codeword may be mapped to one layer on a symbol basis, one codeword can be distributedly mapped to up to four layers. If one codeword is distributedly mapped to a plurality of layers, symbols included in each codeword may be sequentially mapped to the layers and then transmitted. In a single-codeword transmission configuration, only one encoder and one modulation block are used.

In addition, transform precoding can be applied to layer-mapped signals. Specifically, Discrete Fourier Transform (DFT) based precoding may be applied to the layer-mapped signals. The layer-mapped signals are multiplied by a predetermined precoding matrix selected based on the channel state and then allocated to transmission antennas. Thereafter, the per-antenna transmitted signals are mapped to time-frequency resource elements to be used for transmission and then transmitted via the individual antennas after passing through an OFDM signal generator.

New RAT

To satisfy the low-latency requirement among new RAT performance requirements, a new subframe needs to be designed.

[Self-Contained Subframe]

Figure 6:
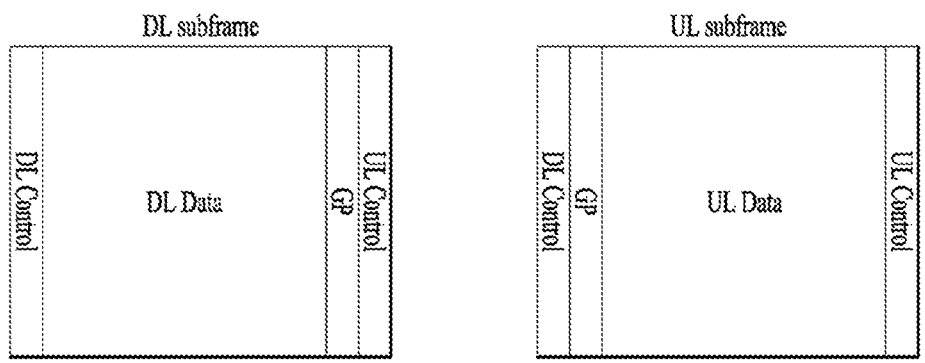
FIG. 6 illustrates the structure of a self-contained subframe according to an embodiment of the present disclosure.

FIG. 6 illustrates a self-contained subframe proposed for the new RAT system. In the following description, the self-contained subframe can be referred to as a subframe for simplicity.

According to a TDD-based self-contained subframe structure, both a resource region for DL and a resource region for UL (e.g., DL and UL control channels) exist in one subframe.

Although FIG. 6 shows the structure of the self-contained subframe where the subframe is composed in the following order: DL control region—data region—UL control region, the present disclosure is not limited thereto. For example, as another self-contained subframe structure, a subframe may be composed in the following order: DL control region—UL control region—data region.

The self-contained subframe can be classified as either a DL self-contained subframe or a UL self-contained subframe depending on the direction of data transmission in the corresponding subframe.

This self-contained subframe structure requires a time gap that allows an eNB and a UE to switch a transmission mode to a reception mode and vice versa. To this end, at least one OFDM symbol on which DL-to-UL switching is performed is set as a guard period (GP) in the self-contained subframe structure. The GP is located at the time when the DL-to-UL switching is performed. For example, in a DL subframe, the GP is located between a DL data region and a UL control region, and in a UL subframe, the GP is located between a DL control region and a UL data region.

Meanwhile, one subframe can be defined to have constant time duration. For example, in the New RAT (NR) system, the time duration of one subframe may be fixed to 1 ms. In this case, since the duration of one symbol is determined by subcarrier spacing, the number of symbols included in one subframe may also be determined by the subcarrier spacing. For example, if subcarrier spacing is 15 kHz, 14 symbols may be included in one subframe. However, if the subcarrier spacing doubles, that is, increases to 30 kHz, the duration of one symbol decreases by half. Thus, a total of 28 symbols may be included in one subframe. Generally, subcarrier spacing of 15 kHz * 2 n can be used, and thus a total of 14 * 2 n symbols can be included in one subframe, where n is an integer such as 0, 1, 2, . . . , but n may not be necessarily a positive integer. For instance, if n is a negative integer, −1, a total of 7 symbols are included in one subframe.

[Contention-Based Data Transmission with Preamble]

Compared to contention-free or grant-based data transmission, contention-based data transmission has low signaling overhead and low latency. However, when the contention-based data transmission is applied in an environment where the packet arrival rate (PAR) is high, collision probability may increase. In this case, since retransmission frequently occurs due to the increased collision probability, the contention-based data transmission may be less efficient than the contention-free (CF) data transmission.

Therefore, a transmission method needs to be designed by considering various factors such as a PAR, a packet size, the number of UEs, the size/periodicity of a contention resource region, etc.

Herein, data transmitted based in a contention-based manner may be simply referred to as contention-based (CB) data.

Proposed methods can be classified into, for example, (i) CB data transmission with preamble, (ii) preamble pattern for HARQ and/or repetition, and (iii) CB data transmission with control channel.

Herein, multi-access (MA) signature information may include a codebook, a codeword, a sequence, an interleaver, a mapping pattern, a reference signal (RS), etc. In addition, the MA signature information may also include information used for identifying multiple users.

Meanwhile, when a preamble is used for reception, the complexity of blind detection may be reduced. In addition, an eNB may obtain some or all of the UE identification information from a preamble transmitted from a UE and thus perform HARQ more easily.

Preamble and Data Structure

First, the time/frequency structure of a preamble and data will be described.

Figure 7:
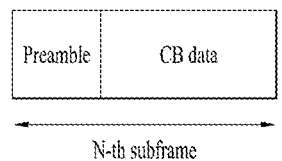
FIG. 7 illustrates a preamble and data according to an embodiment of the present disclosure.

FIG. 7 illustrates a preamble and data according to an embodiment of the present disclosure.

Referring to FIG. 7, the preamble may be placed in contact with a resource region (or zone) for CB data transmission (CB data transmission resource region). For example, a UE may transmit a preamble by locating it immediately before data. The preamble and data may be continuously transmitted in one subframe. Alternatively, the preamble and data may be continuously transmitted in one slot/mini-slot. The subframe/slot/mini-slot may include one or multiple symbols.

For example, the preamble may include a cyclic prefix (CP). When the preamble has orthogonality based on a cyclic shift (CS), the CP may be efficiently used in identifying CS-based preambles.

In addition, a guard time (GT) period may be included in the end (e.g., front or rear end) of the preamble. Even if asynchronous reception that cannot be compensated by the CP occurs, a timing offset may be detected based on the GT, thereby improving synchronization performance.

Figure 8:
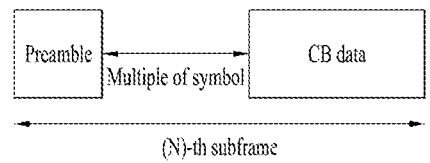
FIG. 8 illustrates a preamble and data according to another embodiment of the present disclosure.
Figure 8:
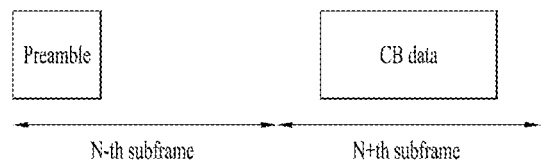

FIG. 8 illustrates a preamble and data according to another embodiment of the present disclosure.

Referring to FIG. 8, the preamble may not be placed in contact with a CB data transmission resource region. That is, the preamble and data may be separated from each other. For example, there may be a time gap between the preamble and data, and in this case, the time gap may correspond to a multiple of the symbol/mini-slot/slot/subframe.

FIG. 8(a) shows a time gap corresponding to a multiple of the symbol, and FIG. 8(b) shows that the preamble and CB data are transmitted in different subframes.

As described above, a CP may be included in the preamble, and a GT period may be included in the front or rear end of the preamble.

Figure 9:
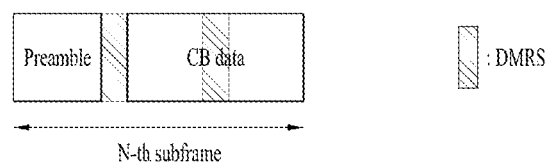
FIG. 9 illustrates a demodulation reference signal (DMRS) and data according to an embodiment of the present disclosure.
Figure 9:
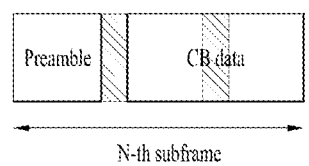

For both cases where a preamble is placed in contact with data or not, the frequency regions of the preamble and data may be identical to or different from each other. When a preamble is placed in contact with data, if the preamble and data have the same frequency region, a DMRS for CB data, which is located at the front position, may be replaced with the preamble or data. When the DMRS is replaced with the data, the preamble may be used for demodulating the corresponding data. FIG. 9 (a) shows a case in which there is a front-located DMRS, and FIG. 9 (b) shows a case in which a front-located DMRS is replaced with data.

Hereinafter, it is assumed that a preamble is not in contact with data for convenience of description. However, the following embodiments can be applied when a preamble is in contact with data.

Meanwhile, resource regions for transmitting a preamble and data may be predefined or preconfigured.

Preamble Index

First, the definition of a preamble index will be described. The preamble index may correspond to a function of the number of sequences and the location of a physical resource. For example, assuming that there are 16 sequences and 400 time/frequency unit blocks, a total of 400*16 preamble indices are present. The time/frequency unit block may mean a minimum unit capable of transmitting one sequence. The preamble index may be determined in advance between a UE and an eNB. In this case, if a specific preamble index is given, the UE and eNB may recognize the sequence number corresponding to the specific preamble index and the location of a resource allocated for preamble transmission.

The eNB may know which preamble index the UE uses. In this case, the preamble index may be used by a single UE or a group of multiple UEs. For example, the same preamble index may be shared by multiple users.

In addition, logical mapping may be applied between the time/frequency unit block and the preamble index, and mapping information may be predefined or preconfigured.

A sequence may correspond to a single resource element (RE) or multiple REs. In addition, preamble sequences to be transmitted at the same position may be orthogonal or non-orthogonal to each other.

An eNB may inform each UE of a preamble index through higher layer signaling (e.g., RRC signaling). For example, the eNB may signal the preamble index in a UE-wise manner or in a group-wise manner.

When the preamble index is allocated on a UE basis, there is no collision between preambles. However, when the preamble index is allocated on a group basis, a preamble collision may occur. When the preamble index is allocated on a group basis, resources may be used more efficiently, whereas when the preamble index is allocated on a UE basis, resource efficiency may be degraded since many resources are reserved in advance.

The eNB may reconfigure the preamble index.

A preamble index may be predefined in an offline manner or in a broadcast manner.

For example, the preamble index may be predefined by being tied to a UE ID. Specifically, the number of UE-wise preamble indices may be equal to the number of UE IDs, and simply, the equation of preamble index=UE ID may be established. However, the present disclosure is not limited thereto, and the 1:1 mapping between the preamble index and UE ID may be established in different ways.

As another example, in the case of the group-wise preamble index allocation, assuming that the number of UE IDs is equal to N * the number of preamble indices, the equation of preamble index=mod (UE-ID, N) may be established. However, the present disclosure is not limited thereto, and the N:1 mapping between the UE ID and preamble index may be established in different ways.

For example, it is assumed that a total of three preamble (mapping) modes: 1:1 mapping mode, N:1 mapping mode, and M:1 mapping mode (where 1<N<M) are used for the mapping between the UE ID and preamble index. An eNB may inform each UE of a preamble mode by broadcast over a common control channel or by unicast through higher layer signaling such as RRC signaling, etc. Each UE may obtain its own preamble index by applying a predefined preamble index equation to the received preamble mode.

In the following example, the preamble index may be allocated on a UE basis or a group basis.

When an eNB and a UE uses the preamble index, not only may the overhead of blind detection be reduced, but performance improvement, for example, collision randomization may be achieved.

(i) Linkage/mapping between preamble index and CB data transmission resource: The eNB may allocate the preamble index to indicate a CB data transmission resource region. For example, preamble indices may be divided into 4 groups, and a physical resource region (e.g., resource region where the CB data transmission is performed) may be configured for each group. The separation between the resource regions and the mapping between the groups and resource regions may be predefined or preconfigured through higher layer signaling such as RRC signaling. According to this example, a transmission resource can be recognized by preamble detection, thereby reducing the complexity of blind data detection. For example, the eNB/UE may determine that there is no CB data transmission on a physical resource associated with a group where no preamble is detected and then skip the blind detection thereon.

(ii) Linkage between preamble index and CB data transmission region level: The eNB may allocate the preamble index depending on CB data transmission region levels. The transmission region level may include an MCS level, a coverage level, etc., and corresponding information may be predefined or preconfigured. For example, preamble indices may be divided into two groups. Then, MCS 1 may be applied to the first group, and MCS 2 may be applied to the other group. In this case, the complexity of blind detection for transmission resources may be reduced by preamble detection. For example, the eNB/UE may assume that an MCS associated with a detected preamble is used for data transmission and then not perform blind detection for other MCSs.

(iii) Linkage between preamble index and at least one MA signature: The eNB may associate the preamble index with at least one MA signature. For example, preamble indices may be divided into four groups, and at least one MA signature may be allocated to each group. In this case, mapping between each group and the at least one MA signature may be predefined or preconfigured. For example, among MA signatures, spreading sequence code 1 may be allocated to the first group, spreading sequence code 2 may be allocated to the second group, spreading sequence code 3 may be allocated to the third group, and spreading sequence code 4 may be allocated to the fourth group. In this case, the complexity of blind detection for transmission resources may be reduced by preamble detection. The eNB/UE may assume that an MA signature associated with a detected preamble is used for data transmission and then not perform blind detection for other MA signatures.

(iv) Linkage between preamble index and repetition number: The eNB may allocate the preamble index based on the order of repeated transmission. In addition, a physical resource region for CB data transmission may vary depending on the repetition number. In this case, the repetition number may be 1. For example, assuming that preamble indices are divided into two groups and the numbers of repetitions in the two groups are set to 2 and 4, respectively, the UE may determine which group the UE belongs to from its detected preamble index and then repeat transmission as many times as the repetition number set for the corresponding group. Since each UE is expected to satisfy a different coverage level, the repetition number may be allocated adaptively depending on UEs. For example, the repetition number may be determined by considering UE capability, RACH received power, and/or SRS received power.

Figure 10:
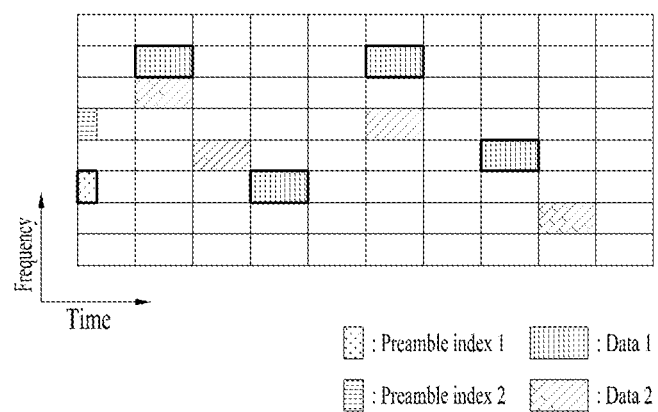
FIG. 10 illustrates transmission resource patterns according to an embodiment of the present disclosure.

(v) Linkage between preamble index and time/frequency resource pattern for repetition/retransmission: The eNB may allocate the preamble index depending on time/frequency resource patterns. FIG. 10 illustrates a transmission resource pattern determined for each preamble index. In FIG. 10, a time resource unit may be a subframe/mini-slot/slot/symbol, and a frequency resource unit may be a subcarrier group such as an RB, RBG, etc. Referring to FIG. 10, it can be seen that a signal is repeated four times according to the resource pattern determined by the preamble index.

Figure 11:
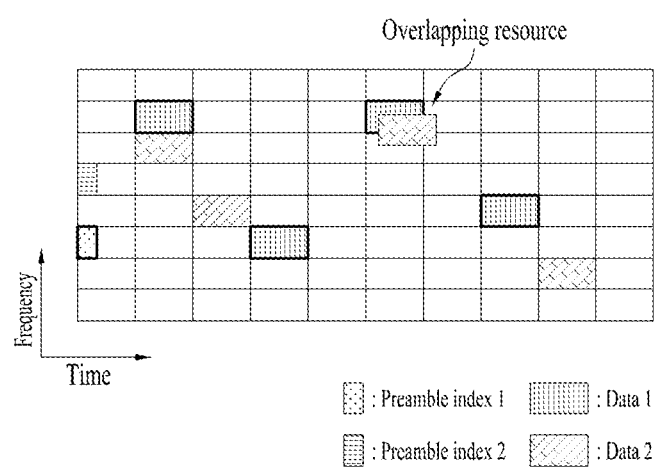
FIG. 11 illustrates a case in which at least some resources overlap between different time/frequency resource patterns according to an embodiment of the present disclosure.

FIG. 11 illustrates a case in which at least some resources overlap between different time/frequency resource patterns. For example, a prescribed resource may be commonly included in resource pattern 1 corresponding to preamble index 1 and resource pattern 2 corresponding to preamble index 2.

In the case of retransmission, an RV value may be changed according to a predefined pattern. For example, RV values in fourth retransmission may be set to RV1, RV3, RV2, and RV0, and the positions thereof may be different from those in third retransmission. In addition, it is assumed that in the third retransmission, a UE repeatedly transmits data four times on four resources determined by preamble index 1, and the RV pattern of the data transmitted on the four resources is RV0, RV1, RV2, and RV3. In this case, if the RV pattern of data transmitted in the fourth retransmission, which the UE transmits on the four resources determined by preamble index 1, is different from that of the third retransmission, the retransmission success probability may be improved. Specifically, there may be an important RV value that affects the success of data decoding more than other RV values among RV0 to RV2. When the UE transmits data corresponding to the important RV value on the same time/frequency resource (1, k) in a subframe at every retransmission, if there is strong interference on the time/frequency resource (1, k), the UE may fail to transmit the data corresponding to the important RV value. In this case, if the location of the resource for transmitting the data corresponding to the important RV value is randomly changed within the subframe, such a problem may be solved. In other words, even though a resource pattern is used based on the same preamble index, an RV pattern to be applied for the corresponding resource pattern may be configured differently in each retransmission.

When repetition/retransmission is performed in the time domain as described above, coverage may be extended. In addition, if different resource patterns are configured to have some common resources, more UEs may be accommodated.

(vi) Linkage between preamble index sequence and number of transmission attempts: The eNB may allocate a preamble index sequence to the UE. For example, the preamble index sequence may be determined based on the number of times of repetition/retransmission.

The eNB may inform all UEs of the starting point of new transmission. Alternatively, the starting point of the new transmission may be changed periodically, and the eNB and UE may know the starting point of the new transmission which periodically appears (for example, it may be predefined, signaled, or broadcast).

In this case, a physical resource region to be used may be divided according to the retransmission/repetition number, and the eNB may inform a group of UEs of the starting point of the new transmission based on the divided physical resource region.

In addition, a different RV value may be configured for each preamble index sequence. When the indices of four preambles: p1, p2, p3, and p4 are defined as {p1, p2, p3, p4}={1, 1, 2, 2}, corresponding RV values may be set to {0, 0, 3, 3}. Here, p1 is the preamble of first transmission and the index thereof is 1. When the index is 1, the RV value is 0.

Figure 12:
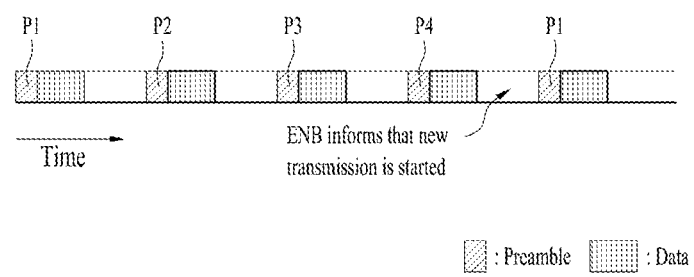
FIG. 12 illustrates an example in which a preamble and data are repeated/retransmitted while being in contact with each other according to an embodiment of the present disclosure.

FIG. 12 illustrates an example in which a preamble and data are repeated/retransmitted four times while being in contact with each other. Referring to FIG. 12, the UE transmits data based on a designated preamble index sequence. Thus, by performing preamble detection, the eNB may know how many times the corresponding UE or UE group performs data transmission.

As described above, the eNB may know the number of transmission attempts from preamble detection and perform HARQ combining based thereon.

Although the examples described above in sections (i) to (vi) may be implemented independently, two or more of the examples in sections (i) to (vi) may be combined for implementation thereof.

UE's Preamble Selection

An eNB may inform a UE of a set of preamble indices, and the UE may transmit additional information to the eNB by selecting a preamble from the set.

(a) Linkage between preamble index and CB data transmission region level: The UE may perform transmission by selecting the preamble index depending on transmission region levels. In addition, the UE transmits data based on a corresponding transmission region level. For example, assuming that the UE is allocated a preamble index set of {1,2,3} and the indices correspond to transmission region levels 1, 2, and 3, respectively, the UE may operate by selecting one of the three indices. Here, the transmission region level may include, for example, a coverage level, an MCS level, and/or a repetition level. For instance, if the UE is at a cell edge, the UE may need to repeat transmission. That is, the UE may select the preamble index based on its necessary repetition level and then repeatedly transmit data. By doing so, the UE may achieve link adaptation. As another example, the UE may measure DL RS power and determine a suitable MCS based on the measured DL RS power. Thereafter, the UE may select the preamble index based on the determined MCS and then transmit data. As described above, the mapping between the transmission region level and preamble index may reduce the complexity of blind detection, and the link adaptation may improve the system performance.

(b) Linkage between preamble index and repetition number: The UE may perform transmission by selecting the preamble index based on the repetition number, which is differently required depending on channel environments. In addition, the UE transmits data as many times as the repetition number corresponding to the selected preamble index. For example, assuming that the UE is allocated a preamble index set of {1,2,3} and the indices correspond to repetition numbers of 1, 2, and 4, respectively, the UE may operate by selecting one of the three indices. For instance, when the UE determines that the channel state is good after measuring DL RS power, the UE may select preamble index 1 and the repetition number of 1. On the other hand, if the channel state is poor, the UE may select preamble index 3 and the repetition number of 4. In this case, the complexity of blind detection is reduced, and the system performance may be improved by link adaptation.

(c) Linkage between preamble index and number of transmission attempts: The UE may use a different preamble index depending on the number of transmission attempts. For example, if the number of times that transmission is performed is equal to or greater than N when the eNB initially attempts to detect a preamble after failing to detect the previous preamble due to a poor channel state, the eNB may allow the corresponding UE to rapidly switch to grant-based operation. In an environment where preamble reception is not guaranteed such as a D2D or V2V environment, the UE may rapidly switch to grant-based transmission mode depending on the number of transmission attempts. For example, the UE may inform the eNB of delay in UE's physical layer data transmission using the preamble index.

(d) Linkage between preamble index and repetition/retransmission mode: The UE may configure the preamble index based on the repetition/retransmission mode. For example, preamble index 1 may correspond to repeated transmission, and preamble index 2 may correspond to retransmission. The eNB may recognize whether corresponding CB data transmission is repeated transmission or retransmission by detecting the preamble index and then perform combining. The mapping relationship between the preamble index and repetition/retransmission mode may be predefined/preconfigured.

(e) Linkage between preamble index (or group index) and RRC configuration (or high layer signaling): The UE may select the RRC configuration based on the preamble index. For example, preamble index 1 may be mapped with RRC configuration 1, and preamble index 2 may be mapped with RRC configuration 2. Here, the RRC configuration may include an MCS, a coding rate, a TBS, etc. Table 1 shows mapping between the RRC configuration and preamble index. According to this example, the UE may dynamically select multiple RRC configurations and use the selected RRC configurations.

TABLE 1

| Index | MCS | Coding rate | TBS |
| --- | --- | --- | --- |
| 1 | 1 | 0.3 | 144 |
| 2 | 2 | 0.5 | 288 |

Although the examples described above in sections (a) to (e) may be implemented independently, two or more of the examples in sections (a) to (e) may be combined for implementation thereof. Additionally, at least one of the examples in sections (i) to (vi) may be further combined.

Figure 13:
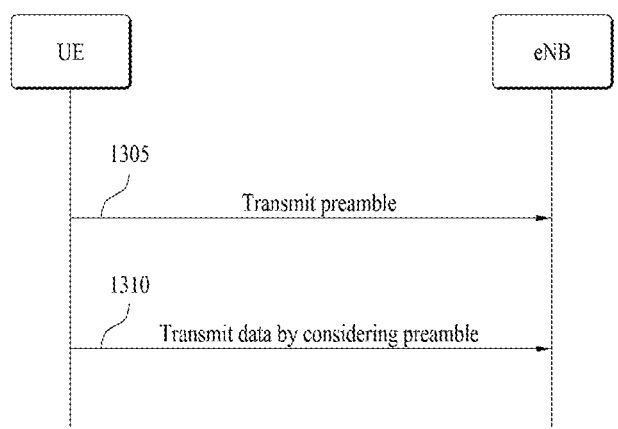
FIG. 13 is a flowchart illustrating a contention-based data transmission method using a preamble according to an embodiment of the present disclosure.

FIG. 13 is a flowchart illustrating a CB data transmission method using a preamble according to an embodiment of the present disclosure. Redundant description will be omitted.

Referring to FIG. 13, a UE transmits any one of multiple preambles (1305).

The UE performs CB data transmission by considering the transmitted preamble (1310).

Each of the multiple preambles may be associated with multiple data resource regions. When performing the CB data transmission, the UE may repeatedly transmit data in multiple data resource regions associated with the transmitted preamble.

The UE may repeatedly transmit the data as many times as the number of multiple data resource regions associated with the transmitted preamble. For example, each of the multiple preambles may be associated with a different number of data repetitions.

Each of the multiple preambles may be allocated on a UE group basis. That is, UEs belonging to the same UE group may use the same preamble.

The UE may receive information on allocation of the multiple preambles from an eNB and select the preamble transmitted by the UE from among the multiple preambles according to its channel state.

A spreading sequence code for CB transmission may be applied to the data, and each of the multiple preambles may be associated with a different spreading sequence code.

Figure 14:
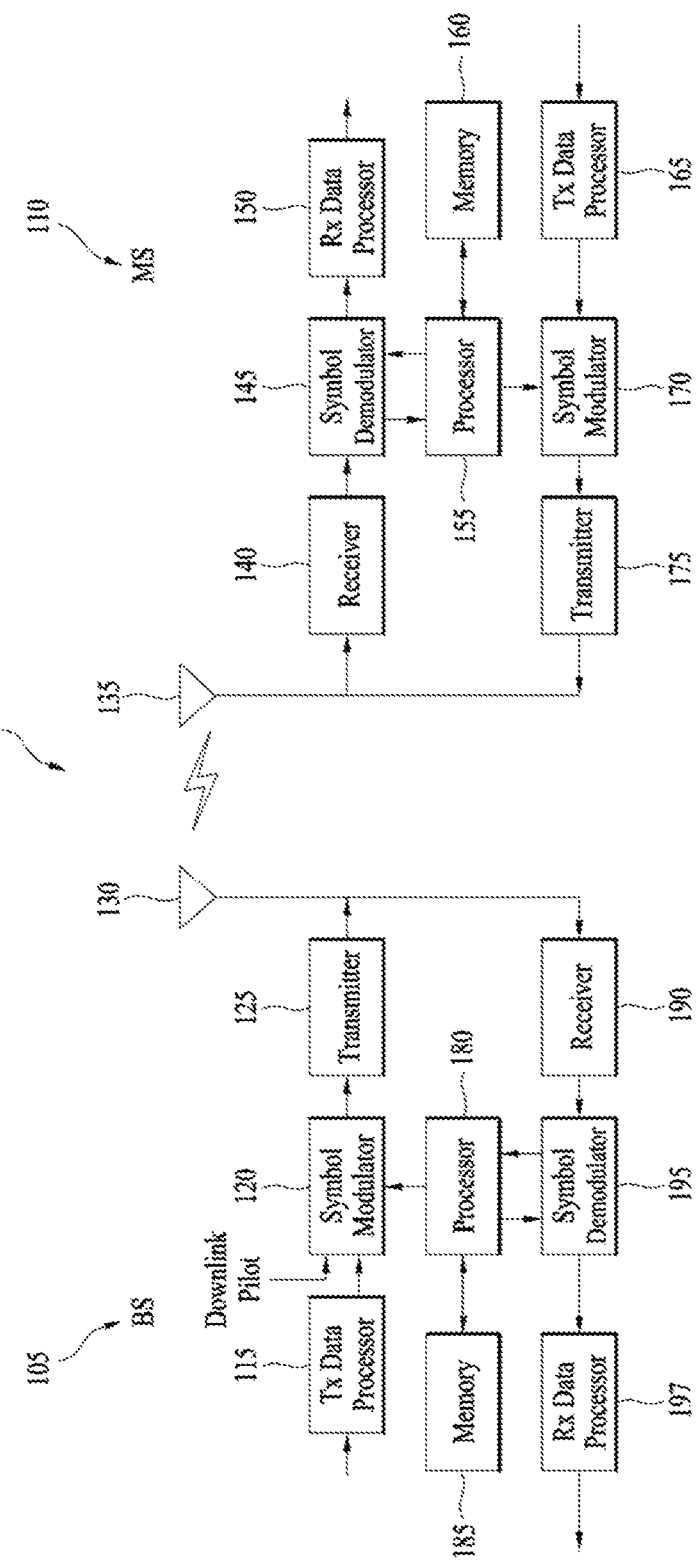
FIG. 14 illustrates a user equipment and a base station according to an embodiment of the present disclosure.

FIG. 14 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 14, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present disclosure supports an MIMO (multiple input multiple output) system. And, the eNB 105 according to the present disclosure may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

The embodiments of the present disclosure mentioned in the foregoing description are applicable to various kinds of mobile communication systems.

The invention claimed is:

1. A method of transmitting an uplink signal by a user equipment (UE) in a wireless communication system, the method comprising:
   measuring a downlink reference signal power;
   determining a contention-based data transmission region level based on the measured downlink reference signal power;
   determining a preamble index from a pre-configured preamble index set based on the determined contention-based data transmission region level;
   transmitting a preamble associated with the determined preamble index; and
   performing contention-based data transmission by considering the transmitted preamble,
   wherein the contention-based data transmission region level includes MCS (modulation coding scheme), coding rate, TBS (transmission block size), and repetition number for repeatedly performing the contention-based data transmission in a repetition mode, and
   wherein in a retransmission mode, a RV (redundancy version) pattern for the contention-based data transmission associated with the determined preamble index is different in each retransmission.

2. The method of claim 1, wherein the preamble index set is allocated on a UE basis.

3. The method of claim 1, further comprising:
   receiving information on allocation of the preamble index set from a base station.

4. A method of receiving an uplink signal by a base station from a user equipment (UE) in a wireless communication system, the method comprising:
   transmitting ,to the UE, information regarding allocation of a preamble index set;
   transmitting a downlink reference signal; and
   receiving a preamble and contention-based data associated with the preamble from the UE,
   wherein the UE determines a contention-based data transmission region level by measuring downlink reference signal power, determines a preamble index from the preamble index set based on the determined contention-based data transmission region level, and transmits the preamble and the contention-based data based on the determined preamble index,
   wherein the contention-based data transmission region level includes MCS (modulation coding scheme), coding rate, TBS (transmission block size) and repetition number for performing repeatedly the contention-based data transmission in a repetition mode, and
   wherein in a retransmission mode, a RV (redundancy version) pattern for the contention-based data transmission associated with the determined preamble index is different in each retransmission.

5. The method of claim 4, wherein the preamble index set is allocated on a UE basi.

6. A user equipment (UE) for transmitting an uplink signal, the UE comprising:
   a transmitter; and
   a processor configured to:
   measure a downlink reference signal power;
   determine a contention-based data transmission region level based on the measured downlink reference signal power;
   determine a preamble index from a pre-configured preamble index set based on the determined contention-based data transmission region level;
   transmit a preamble associated with the determined preamble index; and
   perform contention-based data transmission by considering the transmitted preamble,
   wherein the contention-based data transmission region level includes MCS (modulation coding scheme), coding rate, TBS (transmission block size), and repetition number for performing repeatedly the contention-based data transmission in a repetition mode, and
   wherein in a retransmission mode, a RV (redundancy version) pattern for the contention-based data transmission associated with the determined preamble index is different in each retransmission.

7. The UE according to claim 6, wherein the UE is capable of communicating with at least one of another UE, a UE related to an autonomous driving vehicle, a base station or a network.

8. A base station for receiving an uplink signal from a user equipment (UE), the base station comprising:
   a receiver; and
   a processor configured to:
   transmit, to the UE, information regarding allocation of a preamble index set;
   transmit a downlink reference signal; and
   receive a preamble and contention-based data associated with the preamble from the UE,
   wherein the UE determines contention-based data transmission region level by measuring downlink reference signal power, determines a preamble index from the preamble index set based on the determined contention-based data transmission region level, and transmits the preamble and the contention-based data based on the determined preamble index,
   wherein the contention-based data transmission region level includes MCS (modulation coding scheme), coding rate, TBS (transmission block size), and repetition number for performing repeatedly the contention-based data transmission in a repetition mode, and
   wherein in a retransmission mode, a RV (redundancy version) pattern for the contention-based data transmission associated with the determined preamble index is different in each retransmission.

* * * * *